(12) United States Patent
Hassani et al.

(10) Patent No.: US 11,610,421 B2
(45) Date of Patent: Mar. 21, 2023

(54) CAMERA IDENTIFICATION

(71) Applicant: Ford Global Technologies, LLC, Dearborn, MI (US)

(72) Inventors: Ali Hassani, Ann Arbor, MI (US); Hafiz Malik, Canton, MI (US); Jonathan Diedrich, Carleton, MI (US); Alexandra Taylor, Harbor Springs, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 17/326,460

(22) Filed: May 21, 2021

(65) Prior Publication Data

US 2022/0374642 A1    Nov. 24, 2022

(51) Int. Cl.
| | |
|---|---|
| *G06V 40/10* | (2022.01) |
| *G06V 10/56* | (2022.01) |
| *G06F 18/22* | (2023.01) |
| *G06F 18/214* | (2023.01) |
| *G06F 18/21* | (2023.01) |

(52) U.S. Cl.
CPC ............ *G06V 40/10* (2022.01); *G06F 18/214* (2023.01); *G06F 18/217* (2023.01); *G06F 18/22* (2023.01); *G06V 10/56* (2022.01)

(58) Field of Classification Search
CPC ...... G06V 40/10; G06V 10/56; G06K 9/6201; G06K 9/6256; G06K 9/6262
See application file for complete search history.

(56) References Cited

U.S. PATENT DOCUMENTS

| | | | |
|---|---|---|---|
| 6,879,247 | B2 | 4/2005 | Shimomura et al. |
| 6,920,236 | B2 | 7/2005 | Prokoski |
| 7,602,947 | B1 | 10/2009 | Lemelson et al. |
| (Continued) | | | |

FOREIGN PATENT DOCUMENTS

| | | |
|---|---|---|
| CN | 202887210 U | 4/2013 |
| CN | 204795370 U | 11/2015 |
| (Continued) | | |

OTHER PUBLICATIONS

Chen et al. "Determining Image Origin and Integrity Using Sensor Noise", IEEE Transactions on Information Forensics and Security, vol. 3, No. 1, Mar. 2008 (Year: 2008).*

(Continued)

*Primary Examiner* — Qian Yang
(74) *Attorney, Agent, or Firm* — Frank Lollo; Bejin Bieneman PLC

(57) ABSTRACT

A computer, including a processor and a memory, the memory including instructions to be executed by the processor to divide each of one or more images acquired by a camera into a plurality of zones, determine respective camera noise values for respective zones based on the one or more images, determine one or more zone expected values for the one or more images by summing camera noise values multiplied by scalar coefficients for each zone and normalizing the sum by dividing by a number of zones in the plurality of zones, and determine a source of the camera as being one of the same camera or an unknown camera based on comparing the one or more zone expected values to previously acquired expected zone values.

20 Claims, 5 Drawing Sheets

(56) References Cited

U.S. PATENT DOCUMENTS

| | | | |
|---|---|---|---|
| 8,300,890 | B1 | 10/2012 | Gaikwad et al. |
| 8,374,404 | B2 | 2/2013 | Williams et al. |
| 8,718,335 | B2 | 5/2014 | Mason et al. |
| 8,725,330 | B2 | 5/2014 | Failing |
| 9,886,640 | B1 | 2/2018 | Chen et al. |
| 10,169,671 | B2 | 1/2019 | Matsimanis et al. |
| 10,452,894 | B2 | 10/2019 | Zhang et al. |
| 11,030,470 | B2 | 6/2021 | Han et al. |
| 11,178,363 | B1 | 11/2021 | Qian et al. |
| 11,373,449 | B1 | 6/2022 | Genner |
| 11,481,883 | B2 | 10/2022 | Wildermuth et al. |
| 2002/0136435 | A1 | 9/2002 | Prokoski |
| 2006/0104488 | A1 | 5/2006 | Bazakos et al. |
| 2006/0261931 | A1 | 11/2006 | Cheng |
| 2008/0059027 | A1 | 3/2008 | Farmer et al. |
| 2010/0102366 | A1 | 4/2010 | Lee et al. |
| 2010/0134250 | A1 | 6/2010 | Chung et al. |
| 2010/0141770 | A1 | 6/2010 | Gomi |
| 2010/0201374 | A1 | 8/2010 | Vasilyev et al. |
| 2010/0208951 | A1 | 8/2010 | Williams et al. |
| 2012/0176810 | A1 | 7/2012 | Galbraith et al. |
| 2012/0189225 | A1* | 7/2012 | Li .................... G06T 7/0002 382/260 |
| 2012/0230536 | A1 | 9/2012 | Fridrich et al. |
| 2013/0024123 | A1* | 1/2013 | Ochs ................ A61B 5/726 600/300 |
| 2013/0077958 | A1 | 3/2013 | Xu et al. |
| 2013/0311001 | A1 | 11/2013 | Hampiholi |
| 2013/0342702 | A1 | 12/2013 | Zhang et al. |
| 2013/0342703 | A1 | 12/2013 | Lin |
| 2014/0294262 | A1 | 10/2014 | Schuckers et al. |
| 2014/0307929 | A1 | 10/2014 | Nechyba et al. |
| 2015/0304612 | A1 | 10/2015 | Richards et al. |
| 2016/0019421 | A1 | 1/2016 | Feng et al. |
| 2016/0048736 | A1 | 2/2016 | Chu et al. |
| 2016/0086018 | A1 | 3/2016 | Lemoff |
| 2016/0206216 | A1 | 7/2016 | Kirenko |
| 2017/0091550 | A1 | 3/2017 | Feng et al. |
| 2017/0104916 | A1 | 4/2017 | Mueller |
| 2019/0057268 | A1 | 2/2019 | Burge et al. |
| 2019/0057502 | A1 | 2/2019 | Wang et al. |
| 2019/0228248 | A1 | 7/2019 | Han et al. |
| 2020/0053297 | A1 | 2/2020 | Tokizaki et al. |
| 2020/0134342 | A1 | 4/2020 | Parupati et al. |
| 2020/0250448 | A1 | 8/2020 | Joshi et al. |
| 2020/0334450 | A1 | 10/2020 | Shen et al. |
| 2020/0342245 | A1 | 10/2020 | Lubin et al. |
| 2021/0074138 | A1 | 3/2021 | Micko et al. |
| 2021/0168347 | A1 | 6/2021 | Margolin et al. |
| 2021/0241014 | A1 | 8/2021 | Choiniere |
| 2021/0256281 | A1 | 8/2021 | Henson et al. |
| 2022/0012511 | A1 | 1/2022 | Rowe |

FOREIGN PATENT DOCUMENTS

| | | |
|---|---|---|
| CN | 108319986 A | 7/2018 |
| CN | 110287672 A | 9/2019 |
| CN | 111611977 A | 9/2020 |
| CN | 111738065 A | 10/2020 |
| WO | 2020048140 A1 | 3/2020 |
| WO | 2021157790 A1 | 8/2021 |
| WO | 2022134754 A1 | 6/2022 |

OTHER PUBLICATIONS

Debiasi et al. "PRNU-based Detection of Morphed Face Images", 2018 International Workshop on Biometrics and Forensics (IWBF) (Year: 2018).*

Nagendran, N. et al., "Security and Safety With Facial Recognition Feature for Next Generation Automobiles," International Journal of Recent Technology and Engineering (IJRTE), vol. 7 Issue-4S, Nov. 2018, 6 pages.

Scherhag, U. et al., "Detection of Face Morphing Attacks based on PRNU Analysis," IEEE Transactions on Biometrics, Behavior, and Identity Science (T-BIOM), Oct. 2019, 16 pages.

Mohd Norzali, et al., "Internal State Measurement from Facial Stereo Thermal and Visible Sensors Through SVM Classification," ARPN Journal of Engineering and Applied Sciences, Jan. 2015, 8 pages.

Kim, et al. "A Motion and Similarity-Based Fake Detection Method for Biometric Face Recognition Systems," IEEE Transactions on Consumer Electronics, vol. 57, No. 2, May 2011, 7 pages.

Angelopoulou, E., "The Reflectance Spectrum of Human Skin," University of Pennsylvania, Scholarly Commons, Department of Computers Information Science, Dec. 20, 1999, 16 pages.

Anderson, R,. et al., "The Optics of Human Skin," The Journal of Investigative Dermatology, vol. 77 , No. J, 1981, 7 pages.

Cooksey, C., et al., "Reflectance Measurements of Human Skin," National Institute of Standards and Technology, Oct. 27, 2020, 3 pages.

Barnes, P. et al., "Spectral Reflectance," U.S. Department of Commerce, Technology Administration, National Institute of Standards and Technology, Mar. 1998, 164 pages.

Mhou, K. et al., "Face Spoof Detection Using Light Reflection in Moderate to Low Lighting," 2nd Asia-Pacific Conference on Intelligent Robot Systems, 2017, 6 pages.

Jacquez, J. et al., "Spectral Reflectance of Human Skin in the Region 0.7-2.6," http://jap.physiology.org/, Sep. 13, 2016, 3 pages.

Cooksey, C. et al., "A collection and statistical analysis of skin reflectance signatures for inherent variability over the 250 nm to 2500 nm spectral range," National Institute of Standards and Technology, Jun. 4, 2014, 2 pages.

Spinoulas, Leonidas, et al. "Multispectral biometrics system framework: Application to presentation attack detection." IEEE Sensors Journal 21 vehicle 13 (2021): 15022-15041 . (Year: 2021).

M. Kriéto and M. Ivasic-Kos, "An overview of thermal face recognition methods," 2018 41st International Convention on Information and Communication Technology, Electronics and Microelectronics (MIPRO), 2018, pp. 1098-1103, doi: 10.23919/MIPRO.2018.8400200. (Year: 2018).

Hermosilla, Gabriel, et al. "A comparative study of thermal face recognition methods in unconstrained environments." Pattern Recognition 45.7 (2012): 2445-2459. (Year: 2012).

K. R. Kakkirala, S. R. Chalamala and S. K. Jami, "Thermal Infrared Face Recognition: A Review," 2017 UKSim-AMSS 19th International Conference on Computer Modelling & Simulation (UKSim), 2017, pp. 55-60, doi: 10.1 109/UKSim.2017.38. (Year: 2017.

H. Steiner, A. Kolb and N. Jung, "Reliable face anti-spoofing using multispectral SWIR imaging," 2016 International Conference on Biometrics (ICB), 2016, pp. 1-8, doi: 10.1 109/1CB.2016.7550052. (Year: 2016).

Sånchez-Sånchez MA et al, Convolutional Neural Network Approach for Multispectral Facial Presentation Attack Detection in Automated Border Control Systems. Entropy (Basel). Nov. 2020 doi: 10.3390/e2211 1296. MID:33287064; PMCID PMC7712294. (Year: 2020).

Final Office Action for U.S. Appl. No. 17/326,511, filed May 21, 2021, as issued by the USPTO dated Dec. 29, 2022.

Non-FInal Office Action for U.S. Appl. No. 17/326,490, filed May 21, 2021, as issued by the USPTO dated Jan. 23, 2023.

\* cited by examiner

CAMERA IDENTIFICATION

BACKGROUND

Vehicles, buildings and devices such a computers and cell phones can be equipped with computing devices, networks, sensors, and controllers to acquire and/or process data regarding the vehicle, building or devices' environment and to operate the vehicle, building or device based on the data. Sensors included in a vehicle, building or device can provide data concerning users seeking access to the vehicle, building or device. Operation of the vehicle, building or device can rely upon acquiring accurate and timely data regarding objects in an environment around the vehicle, building or device.

DETAILED DESCRIPTION

Figure 1:
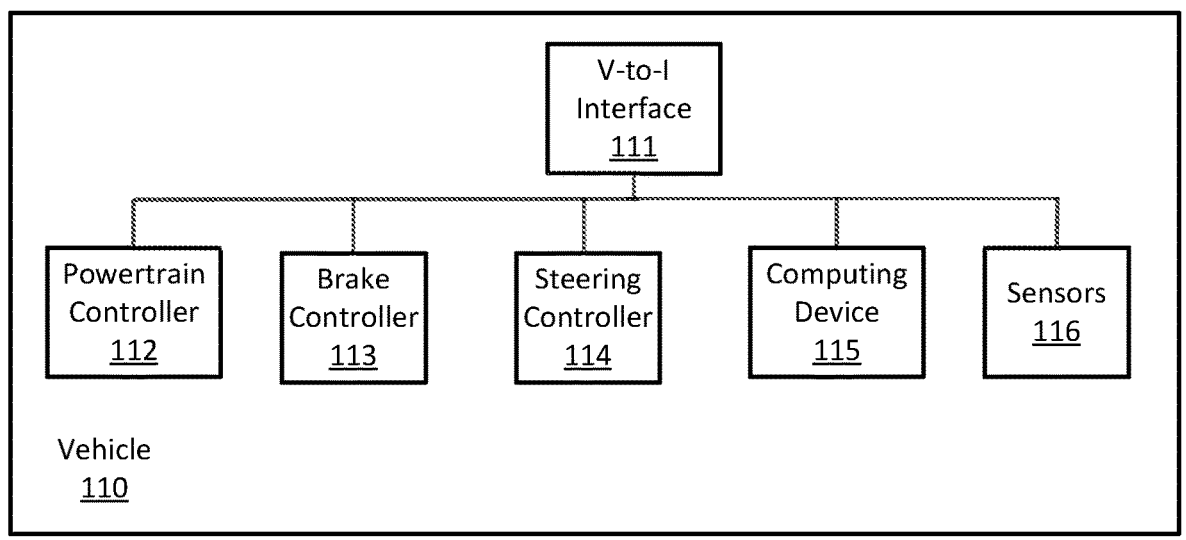
FIG. 1 is a diagram of an example vehicle.

A computing device can be used for biometric authorization based on acquiring image data regarding a user of a vehicle, building, or a device from a camera. For example, a camera in a vehicle can be uses for security applications by acquiring an image of a human approaching the vehicle, building or device and, upon determining the identity of the human based on biometric authorization, unlocking the vehicle's or building's doors to permit the operator to enter the vehicle or room in included in the building. Likewise, cameras included in the interior of the vehicle or in a device can acquire one or more images of a user and, upon determining the identity of the operator based on biometric authorization, accept commands from the human to operate the vehicle or device. A camera can also be used acquire data to be communicated to a computing device in a vehicle to operate the vehicle. For example, a computing device can detect objects such as pedestrians and other vehicles and operate the vehicle so as to avoid the objects. A camera can also be used to control robot operation or other devices as part of a manufacturing process where the operation of a robot or other manufacturing device is based on image processing using obtained from a camera.

Facial recognition is a type of biometric authentication, where human body measurements are used to determine an identity of a user to perform access control. An example of facial identification software is Face Tracker. Face Tracker is a facial recognition software library written in C++ and available on facetracker.net under the MIT software license. Facial identification software typically operates by comparing calculated physiological characteristics based on an acquired image to stored physiological characteristics from a trained model that was generated from a previously acquired enrollment image. Successful authentication can be used to unlock a door to enable access to a vehicle, building or room or enable vehicle, computer or cell phone controls. Vehicle and manufacturing control operations can depend upon machine vision software to identify and locate objects in a field of view of a camera.

Biometric authorization, and vehicle and image processing based manufacturing control operations can all depend upon having the same camera acquire data at both enrollment or set up time and at challenge or operation time. Biometric authorization, for example facial identification, can include first acquiring an enrollment image of a user. The enrollment image is processed using facial recognition software to compress the enrollment image into a list of features and their locations in the enrollment image. At a later time, when the user approaches the vehicle, building or device seeking access, a second or challenge image is acquired. The challenge image is processed with the facial identification software to compress the challenge image into a list of facial features and their locations in the challenge image. The list of features and locations from the enrollment image can be recalled and the two lists of features and locations can be compared by the facial identification software to determine whether the user in the challenge image is the same person as the user in the enrollment image. Performing the comparison used the compressed lists of features improves the efficiency of the comparison and reduces the computational resources required over performing the comparison using uncompressed image data.

Vehicle operation based on processing image data can depend upon having the same camera set up the operation and process subsequently acquired image data. Vehicle operation can be performed by using machine vision software including machine learning software such as neural networks to determine objects and locations in image data acquired by sensors included in a vehicle. Once a machine vision algorithm is set up to run with image data from a particular sensor by adjusting parameters included in the machine vision software, changing a camera for a different camera can cause the machine vision software to produce erroneous results unless the parameters are changed to suit the new camera. For example, if the machine vision software is programmed to identify pedestrians, changing the camera to a different camera can cause the machine vision system to mis-identify pedestrians. Vehicle operation can be improved by verifying the camera source. Verifying the camera source is determining the source of an image by determining whether a camera has been changed for a different camera between set up and operation.

Robot and manufacturing operations can rely on machine vision software to identify and locate objects in a field of view of a camera. For example, a camera field of view can include an assembly line where objects to be picked up by a robot occur. Likewise, a camera can be included in a manufacturing machine to inspect assembled parts using machine vision software. Both of these applications can require set up, where parameters included in the machine vision software are adjusted to permit the machine vision software to identify, locate, and inspect parts correctly. Changing a camera for a different camera can require that the parameters be re-adjusted to permit correct operation of the machine vision software. Robot and manufacturing operations can be improved by verifying a camera source change between set up and operation.

A difficulty image-base authentication or processing tasks can be "spoofing." Spoofing occurs when a counterfeit image is used as input to an authentication or machine vision software. Counterfeit versions of an authorized user's facial features can be included in a fake image generated by combining image data from an image of the user obtained from a different camera and edited to appear as if the user was currently in an environment around a vehicle, building or device. The edited image data can be supplied to the computing device for biometric authorization to spoof the computing device into authorizing a non-existent user. Counterfeit images can also be supplied to machine vision systems by nefarious operators to cause harm to objects in a vehicle's or robot's environments, for example. Safe and accurate operation of image-based computing systems including biometric authorization and machine vision systems can be improved by camera source verification. In examples where camera source verification determines that the camera has been changed or a counterfeit image has been acquired, the computing device can prevent further processing. For example, the computing device can prevent images from being communicated to processes that perform biometric authorization, vehicle operation or machine vision for robot or manufacturing. In addition, the computing device can transmit a message that indicates that further processing has been prevented because of the camera source cannot be verified as correct, meaning that the camera source of the current image is the same as a previous camera. The message can include a diagnostic error code and a notice to a user via a human-machine interface that indicates that camera source verification has been unsuccessful.

Techniques discussed herein can improve camera source verification by comparing camera noise values in a current image to camera noise values based on previously acquired images. Camera source verification is a technique for identifying the source of an image by comparing a measure of camera fixed pattern noise to a stored measure of camera fixed pattern noise. Camera fixed pattern noise is the random error in the response of a particular camera photosite or pixel location to the same light stimulus. Measures of statistical distributions of camera fixed pattern noise are like fingerprints: no two cameras have the same distributions of camera fixed pattern noise. Manufacturing variances are such that even two cameras of the same make and model using the same type of image sensor will have characteristic distributions of fixed pattern noise that can be measured and compared to distinguish between the two cameras. Techniques discussed herein can be used to determine whether cameras have been changed between enrollment or set up time and challenge or processing time. Techniques discussed herein can also determine whether a counterfeit image has been supplied to a biometric authorization or machine vision system.

Techniques discussed herein improve camera source verification by processing images from a camera in a series of zones to determine zonal expected values. Zonal expected values are measures of camera noise performed on zones of an image. Camera noise determination as described herein can identify a camera based on its fixed pattern noise. Fixed pattern noise is image noise that occurs at the same pixel location in an image. Camera noise as described herein can distinguish cameras having the same sensor type, optics and electronics based on images of the same scene, where the only differences between cameras can be manufacturing tolerances. Camera noise can be determined for each of the red, green, and blue channels of a color image, or camera noise can be determined based on a single grayscale image determined by combining the red, green, and blue channels. Techniques discussed herein improve determination of camera noise using fewer computing resources than previous techniques for performing camera source verification.

Techniques discussed herein determine camera noise by identifying deviations from an intrinsic property of image data acquired by a given camera. An intrinsic property of the image data includes distributions of noise in the image data. Techniques discussed herein use camera noise characterization to create a binary classification of untampered versus tampered cameras. Relevant noise distribution can be determined based on photo response non-uniformity values (PRNU), for example. PRNU can be used to create an expected noise "fingerprint" for identification of a particular camera. While machine learning faking algorithms can become visually deceptive, the noise "fingerprint" remains intrinsic to the camera. Techniques discussed herein improve vehicle biometric authentication by detecting camera tampering, in particular camera tampering that includes a counterfeit image of a person.

Another technique for determining a camera noise "fingerprint" is to measure camera dark current noise. Camera dark current noise is a measure of the amount of current generated by a camera photosite in the absence of any light stimulation falling on the photosite. A photosite is the portion of a camera sensor that converts incoming light to electrical current. Dark current noise is thermal noise resulting from electrons spontaneously generated within the sensor caused by valence electrons being thermally excited into the conduction band. The variation in the number of dark electrons collected during an exposure is the dark current noise. Dark current noise is independent of the signal level but is dependent on the temperature of the sensor. Each photosite included in a sensor can have a characteristic level of dark current noise which can be combined to identify a particular camera.

Camera dark current noise data can be acquired by masking off a small number of photosites, typically along one or more edges of the sensor to ensure that no light will fall on the photosites. When an image from the camera is acquired, the masked off photosites will show up in the image as dark pixels. By acquiring a long exposure image, sufficient thermal electrons will be generated in the masked off portions of the image to permit measurement of the dark current noise. Because thermal electrons obey Poisson statistics, the dark current noise corresponding to the current generated by the thermal electrons is the square root of the pixel value. The current generated by the thermal electrons is also a function of temperature so the temperature of the sensor can be measured to determine a temperature factor to be multiplied times the pixel values to compensate for temperature. The resulting dark current noise values for the masked off pixels can be combined to be compared to subsequently acquired dark current noise values or retained as an array of pixels to be correlated with subsequently acquired dark current noise values.

FIG. 1 is a diagram of a vehicle 110 including a computing device 115 and sensors 116. The computing device (or computer) 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer, e.g., a cloud server, via a network, which, as described below, includes hardware, firmware, and software that permits computing device 115 to communicate with a remote server computer via a network such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH®, Ultra-Wide Band (UWB),® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer or user mobile device.

As already mentioned, generally included in instructions stored in the memory and executable by the processor of the computing device 115 is programming for operating one or more vehicle 110 components, e.g., braking, steering, propulsion, etc. Using data received in the computing device 115, e.g., the sensor data from the sensors 116, the server computer, etc., the computing device 115 may make various determinations and/or control various vehicle 110 components and/or operations. The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to share data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110.

The vehicle 110 is generally a land-based vehicle 110 capable of operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, lidar, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
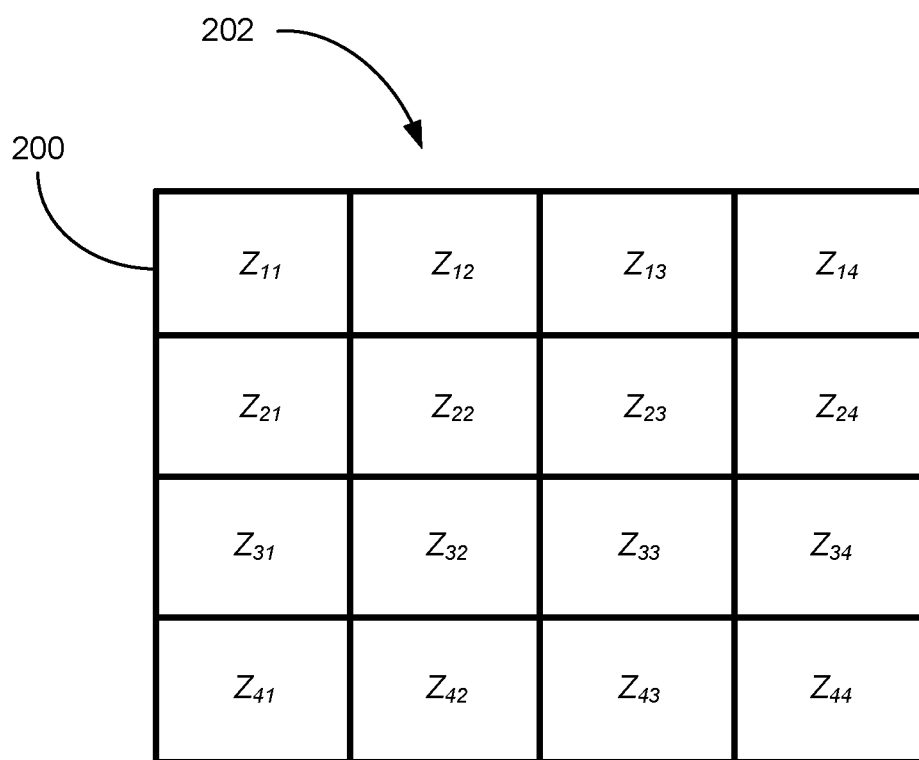
FIG. 2 is a diagram of example image zones.

FIG. 2 is a diagram of an example image 200 divided into zones $Z_{rc}$ 202 where r denotes the row and c denotes the column in which a zone occupies. Zones $Z_{rc}$ 202 are used to determine an average zone expected value E for an image 200 according to the equation $$E = \frac{1}{Z} \times \sum_{r=1}^{Row} \sum_{c=1}^{Col} a_{rc} K_{Z_{rc}} \quad (1)$$

Where Row is the number of rows, Col is the number of columns, Z is the number of zones, $a_{rc}$ is a zone scalar coefficient and $K_{Z_{rc}}$ is the camera noise of each zone $Z_{rc}$ 202. Determining an average zone expected value E rather than computing an overall camera noise value provides greater sensitivity to local differences in fixed pattern noise that can be used to identity a particular camera. The zone scalar coefficients $a_{rc}$ can be adjusted for each zone $Z_{rc}$ 202 to emphasize zones $Z_{rc}$ 202 that have greater variance in fixed pattern noise and de-emphasize zones that have lower variances in fixed pattern noise and thereby increase the sensitivity zone expected value E. Variance in fixed pattern noise corresponds to variance in camera noise values for each zone.

In addition to optimizing performance, determining a zone expected value E rather than an overall camera noise value also permits reduction in computing resources by permitting sub-sampling of the image data. In comparison with calculating and global camera noise measure, performance of the zone expected value E increased 8% for full-scale resolution, where all the image pixels are included in the calculations, 20% for quarter-scale resolution, where one pixel is selected or determined based on a 2×2 neighborhood, and 22% for sixteenth-scale resolution, where one pixel is selected or determined based on a 4×4 neighborhood. Techniques discussed herein can be improved by determining camera noise values based on quarter-scale resolution or sixteen-scale resolution rather than full-scale resolution.

A technique for determining camera noise is calculation of photo response non-uniformity (PRNU). PRNU for the selected zone $Z_{rc}$ 202 is calculated by first calculating an unbiased estimator $\hat{K}$ for each pixel of the zone $Z_{rc}$ 202 according to the equation:

$$\hat{K} = \frac{\sum_{i}^{m} W_i I_i}{\sum_{i}^{m} (I_i)^2} \qquad (2)$$

Where $I_i$ is a pixel value of the i-th image and $W_i$ is noise residual of the i-th image determined by filtering the i-th image with a de-noising filter, such as a wavelet filter or a smoothing filter to form a filtered image $I_i^{(O)}$ and then subtracting the filtered image $I_i^{(O)}$ from the unfiltered image $I_i$ to form the noise residual $W_i = I_i - I_i^{(O)}$. Unbiased estimator $\hat{K}$ has zero mean; therefore, PRNU values for a zone $Z_{rc}$ 202 can be determined by subtracting the unbiased estimator $\hat{K}$ from each pixel value thereby determining PRNU values based on the difference between the unbiased estimator $\hat{K}$ and the pixel values in the zone $Z_{rc}$ 202 of image 200. Statistics can be calculated for the PRNU values over the zone $Z_{rc}$ 202 including a mean, a first moment or variance, a second moment or skewness, and third moment or kurtosis, yielding four zone expected values E for a single zone $Z_{rc}$ 202 of a grayscale image 200. In examples where image 200 is an RGB color image, the four PRNU values can be calculated for each color channel. Determining four PRNU values (mean, variance, skewness, and kurtosis) for each channel of an RGB color image can yield 12 PRNU values for a zone $Z_{rc}$ 202.

Once the PRNU values for the zone $Z_{rc}$ 202 are determined and zone expected values E for each zone $Z_{rc}$ 202 are determined, zone expected values E for each color and moment can be compared to zone expected values E previously determined for a particular camera to determine whether the zone expected values E match previously determined zone expected values E within user-determined tolerances. Matching zone expected values E with previously determined zone expected values E, respectively, based on one or more images previously acquired by the same camera can determine whether the camera is the same camera as a previously measured camera and whether the image has been tampered with. Camera tampering can be detected by determining changes in zone expected values E for a given camera that exceed empirically determined tolerance values. Successful camera source identification requires that zone expected values E for all four moments (mean, variance, skewness, and kurtosis), match previously acquired zone expected values E for all acquired color channels (grayscale or RGB) within determined tolerance values. Mean, variance, skewness, and kurtosis can also be determined for camera dark current noise and the same techniques for comparing PRNU values can be used to compare camera dark current noise statistics.

Zone expected values E are a technique for combining camera noise values for a plurality of zones that maintains sensitivity to small changes in camera noise values while providing reductions in computing resources required to determine camera tampering. Successfully matching zone expected values E with previously acquired zone expected values E from the same camera within user-defined tolerances can determine that the camera has not been tampered with and the image is not a counterfeit. The tolerance values can be determined empirically by acquiring a plurality of zone expected values E for a plurality of images and measuring the distribution of zone expected values E. Tolerance values can be set at one standard deviation from the mean values, for example. In examples where camera dark current noise is used to determine zone expected values E, the zone would coincide with the portions of the image sensor that were masked to permit measurement of dark current noise.

The zone expected values E for the zones $Z_{rc}$ 202 also be compared with previously determined zone expected values E inputting the zone expected values E to a neural network previously trained using a plurality of zone expected values E from a plurality of images from the camera to determine a confidence score prediction. The confidence score prediction is indicative of how well the current zone expected values E for a zone $Z_{rc}$ 202 match the zone expected values E previously determined for the camera. A camera can be determined to be tampered with when the confidence score prediction is less than a user-determined threshold. The threshold value can be determined empirically be calculating zone expected values E for the same camera a plurality of times and determining the variance in the zone expected values E. Comparing zone expected values E using confidence score prediction can increase the accuracy of verifying camera identity at the cost of increasing the computing resources required to detect counterfeit images.

Figure 3:
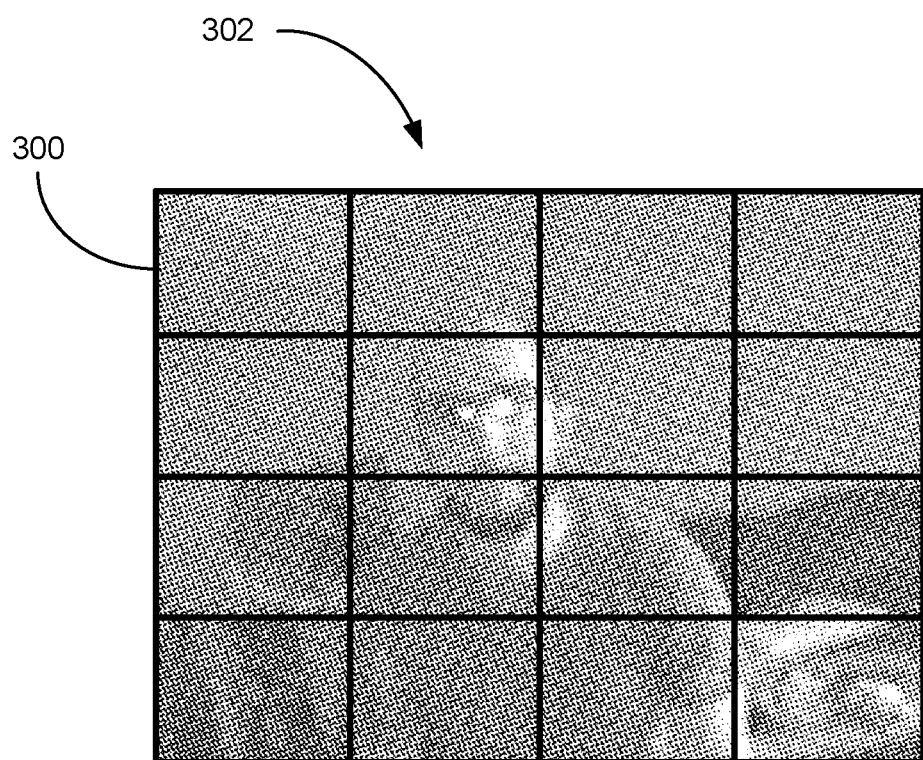
FIG. 3 is a diagram of an example image including zones.

FIG. 3 is a diagram of an example image 300 divided into zones $Z_{rc}$ 302. Advantages of calculating PRNU or camera dark current noise as described above in relation to FIG. 2 are that PRNU values or camera dark current noise values can be determined without having to present one or more predetermined targets, such as sinusoidal patterns at predetermined lighting levels to a camera in order to calculate Camera noise values can be calculated using image 300, for example, because equation has zero mean despite objects in the field of view. Calculation of camera noise values for zones $Z_{rc}$ 302 can include acquiring a plurality of frames of image data that include the same objects in the same locations and calculating camera noise values for each zone $Z_{rc}$ 302 in image 300. The camera noise values can be combined to form an expected zone value E, template matched to determine a peak correlation energy or processed with a neural network to determine a confidence score prediction.

Figure 4:
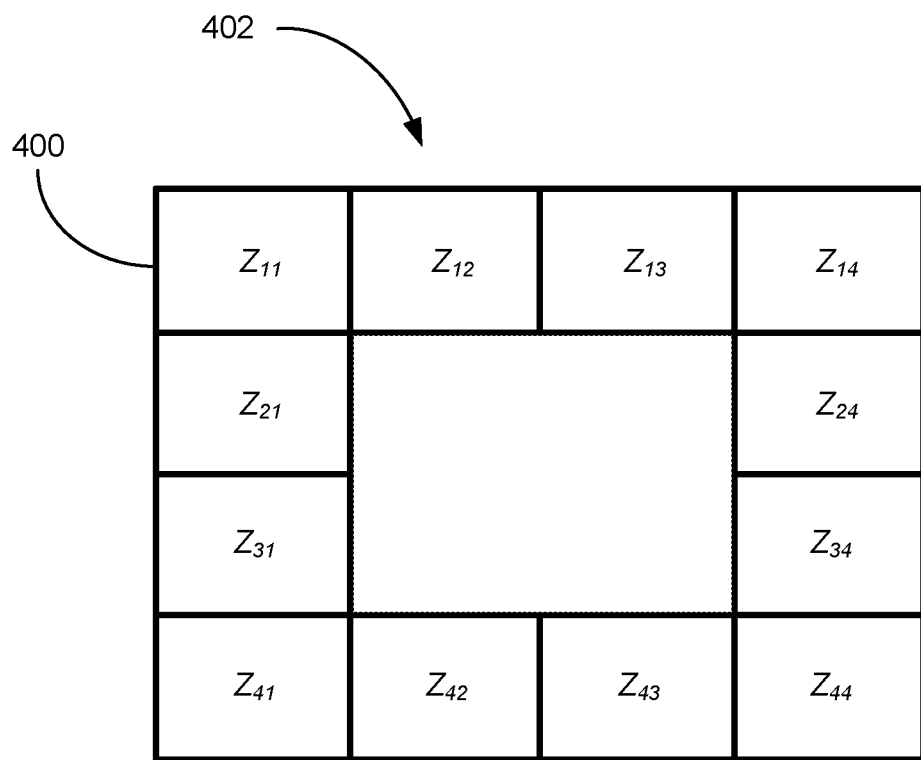
FIG. 4 is a diagram of example asymmetric zone selection.

FIG. 4 is a diagram of an image 400 divided into zones $Z_{rc}$ 402. Not all zones $Z_{rc}$ 402 are equally effective in determining camera tampering, so asymmetric zone $Z_{rc}$ 402 selection can be used to select a subset of zones $Z_{rc}$ 402 to be used in calculation of camera noise values. In some examples, zones $Z_{rc}$ 402 near the edge of image 400 have higher fixed pattern noise that zones $Z_{rc}$ 402 near the center of image 400. Also, in examples where dark current noise is used, zones $Z_{rc}$ 402 near the edge of image 400 correspond to masked regions of the image sensor. In an example, the scalar coefficients $a_{rc}$ can be adjusted to give zones $Z_{rc}$ 402 near the edges of image 400 more weight and zones $Z_{rc}$ 402 less weight based on variances in camera noise values. Zone with higher camera noise values can be given more weight by increasing the scalar coefficient $a_{rc}$ and zones having lower camera noise value can be given less weight by decreasing the scalar coefficients $a_{rc}$. In FIG. 4, zones $Z_{rc}$ 402 in the center of image 400 are set to zero and PRNU values are not calculated for these zones $Z_{rc}$ 402. Selecting a subset of zones based on variation in fixed pattern image noise can increase sensitivity and decrease computing resources required to determine camera tampering. Techniques described herein improve camera source identification by selecting zones $Z_{rc}$ 402 corresponding to high variation in image fixed pattern image noise. Camera noise values corresponding to zones $Z_{rc}$ 402 having high variation can be multiplied by scalar coefficients to select the zones, for example.

Asymmetric zone $Z_{rc}$ 402 selection can be performed in other ways, for example principal component analysis can be used to determine the zones $Z_{rc}$ 402 that are most likely to indicate camera tampering. Principal component analysis assumes that each frame or image of a series of N images F is a random variable that includes M pixels:

$$F = \{F_1, F_2, \ldots F_1\} \quad (3)$$

Each frame $F_t$ is assumed to include pixels corresponding to the same portion of a scene which means that any differences between corresponding pixels of the frames F is due to camera noise. The noise can be analyzed by calculating a covariance matrix S equal to the differences between pixels over the frames F. The covariance matrix S can be diagonalized using eigenvectors to form principal components $Y_\alpha$ according to the equation:

$$Y_\alpha = \Sigma_t^N e_{t,\alpha} F_t \quad (4)$$

Where $e_{t,\alpha}$ is the t-th component of eigenvector $\alpha$. The principal components can be divided into three groups, fixed pattern noise (FPN), interaction noise (IN), and temporal noise (TN). FPN corresponds to the image data that occurs in all of the frames F, i.e. the image of the scene in the field of view of the sensor. IN corresponds to image artifact introduced into the image by the camera data acquisition process and is correlated with regions of the frames F where the pixel data varies the most. For example, cameras that compress image data before transmitting the image data to a computing device 115 for decompression introduce pattern noise related to the compression/decompression process. TN is random image noise corresponding to electronic noise and photon quantum noise.

Calculation of the principal components $Y_\alpha$ produces the principal components $Y_\alpha$ in the order in which the components account for variation in the frames F. FTN accounts for most of the variation in pixel values, followed by IN components and finally TN components. Variance in the IN components and the TN components can be determined by measuring the squared differences between the values of IN and TN for each pixel in the series of N frames with respect to the mean and the variances averaged to get overall IN and TN scores for the series of images and therefore the camera. The IN and TN scores can be averaged over the zones $Z_{rc}$ 302, 402 and compared to IN and TN scores previously obtained for the camera to determine whether the camera has been tampered with. Any change in IN or TN scores greater than an empirically determined tolerance will indicate that the camera may have been tampered with and therefore any image data acquired from the camera should not be trusted for biometric authorization or autonomous vehicle operation.

The techniques discussed herein regarding camera source verification can be subject to reinforcement learning. Reinforcement learning is performed by keeping statistics regarding the number of correct and incorrect results achieved by a camera source verification system in use and using the statistical results to re-train the camera source verification system. For example, assume a camera source verification system is used as input to a biometric authorization system used to unlock a vehicle, building, or device when approached by a valid user. A valid user is a user with prearranged permission to use the vehicle, building, or device. In an example where the camera source verification system fails to correctly verify a camera source and unlock the vehicle, the user can be forced to unlock the vehicle manually with a key or fob, or use a 2-factor authorization system such as entering a code sent to a cell phone number. When a user is forced to unlock the vehicle manually, the camera source verification system can store data regarding the incorrect camera source data including the image of the user.

Determining what to do with data regarding the incorrect camera source verification can be based on a reward system. A reward system retrains the camera source verification system corresponding to the camera source verification data depending upon the outcome of the failure to authenticate. If the potential user fails to gain access to the vehicle, it is assumed that the failed attempt was an attempted spoof, and the data is appended to a training dataset of likely spoof data. If the potential user gains access using one of the manual approaches, for example keys, fobs, or 2-factor authorization, the data is appended to a training dataset of false negatives to be corrected in the training process. The authentication system can be retrained based on the updated training dataset periodically or when the number of new camera source verification datasets added to the training dataset exceeds a user-determined threshold. Retraining can be applied to both deterministic authentication systems based on Gaussian parameters and deep neural network-based systems.

Data regarding failure to verify a camera source can be federated or shared among a plurality of vehicles. The data regarding failure to verify a camera source can be uploaded to a cloud-based server that includes a central repository of training datasets. The uploaded verify a camera source datasets and corresponding outcomes can be aggregated in updated training datasets and results of retraining based on the new data can be compared to results for the previous training. If the new training dataset improves performance, the new trained model can be pushed or downloaded to vehicles using the camera source verification system. Note that no personal data regarding users' identities needs to be uploaded to the cloud-based servers, only camera source verification datasets and outcomes. By federating new trained models based on training data uploaded from a plurality of locations, performance of an camera source verification system can be continuously improved over the lifetime of the system.

Figure 5:
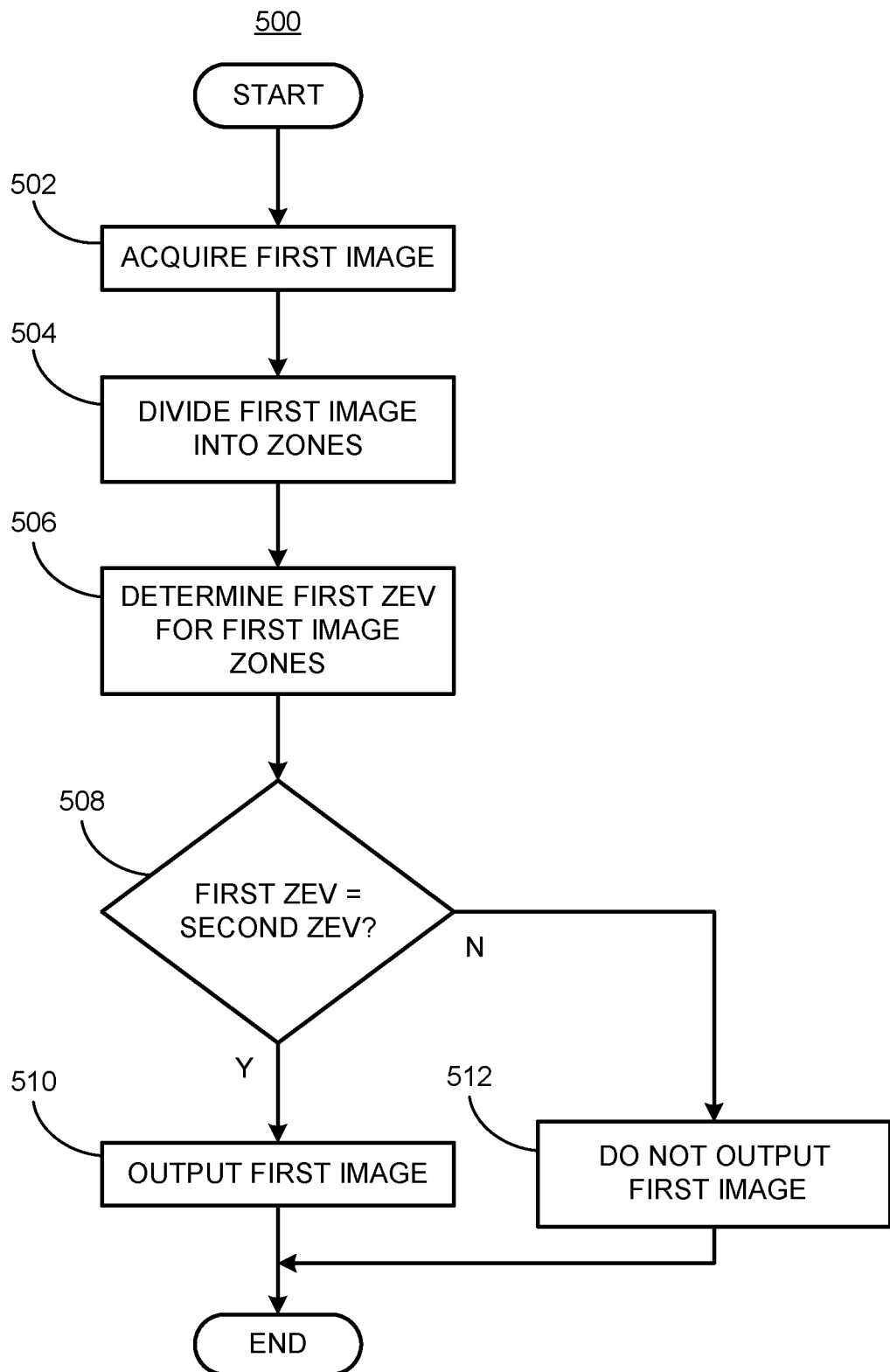
FIG. 5 is a flowchart diagram of an example process to determine camera tampering.

FIG. 5 is a diagram of a flowchart, described in relation to FIGS. 1-4, of a process 500 for determine a source of the camera as being one of the same camera or an unknown camera. Process 500 can be implemented by a processor of a computing device such as a computing device 115, taking as input information from sensors, and executing commands, and outputting object information, for example. Process 500 includes multiple blocks that can be executed in the illustrated order. Process 500 could alternatively or additionally include fewer blocks or can include the blocks executed in different orders.

Process 500 begins at block 502, where a computing device 115 acquires one or more first images with a first camera. As discussed above, these images do not require presentation of a predetermined pattern or lighting.

At block 504 the computing device 115 divides the first images into zones $Z_{rc}$. The zones $Z_{rc}$ can be symmetric and cover the entire first images as illustrated in FIGS. 2 and 3, or the zones $Z_{rc}$ can be asymmetric as shown in FIG. 4.

At block 506 the computing device 115 calculates a zone expected value E for the first images based on mean PRNU values for each zone $Z_{rc}$. The computing device can also calculate variance, skewness and kertosis moments for the pixels of one or more grayscale images or for each of red, green, and blue color channels of one or more RGB color images.

At block 508 the computing device 115 compares the zone expected values E for the first images with a previously acquired zone expected values E acquired by a previous camera. If the zone expected values E for the first images matches the previously acquired zone expected values E within respective tolerance values, process 500 passes to block 510. If the zone expected value E for the first images does not match the previously acquired zone expected value E within a tolerance value, process 500 passes to block 512. The comparison can also be performed on multiple zone expected values E corresponding to the mean, variance, skewness, and kurtosis of red, green, and blue color channels. The comparison can also be performed by calculating peak correlation energy using template matching or calculating a confidence score prediction using a neural network to compare the mean, variance, skewness, and kurtosis of red, green, and blue color channels.

At block 510, the first images have been determined to match the previously acquired images and the first camera is determined to be the same camera as the previous camera, and that the image is not counterfeit. Images from the first camera can be output by the computing device 115, e.g., for biometric authentication to provide access to a vehicle, building or device. For example, computing device 115 in vehicle 110 can include biometric authentication software that processes an image received from sensors 116 to determine an identity of a human to grant or deny access to the vehicle. Images from the first camera can also be communicated to a computing device executing machine vision software that can be used to operate a vehicle, a robot, or a manufacturing process. Camera source verification as performed by process 500 detects and prevents spoofing a biometric authentication process by substituting an image or portion of an image of a human face acquired from a different sensor, possibly at a different time. At block 510 one or more images from a camera can be output to a biometric authentication process that grants access to a vehicle, building including a room or other area, or grant access to a computer or cell phone. Likewise, in examples where a computing device 115 uses the one or more images received from camera for operation of a vehicle 110, a robot or a manufacturing machine, at block 510 the one or more first images can be output to the computing device 115. For example, computing device 115 can operate a vehicle by controlling powertrain, steering and/or brakes to avoid a pedestrian or other vehicle detected in the one or more images, operate a robot, or operate a manufacturing machine by processing the image with machine vision software to determine objects and locations in the image. Following block 510, process 500 ends.

At block 512, the first images have been determined to not match the previously acquired images and the first camera is determined to be tampered with. Images from the first camera cannot be output by the computing device 115 for biometric authentication or operation of a vehicle 110, robot, or manufacturing machine. Preventing the output of images from the first camera can prevent biometric authentication from being spoofed by substitution of tampered images that include a human face that is not actually in the field of view of vehicle sensors 116 i.e., one or more fake images. Likewise, operation of a vehicle 110 based on possibly fake objects in the one or more images can be prevented upon detection of camera tampering by not outputting the one or more images. Following block 512, process 500 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
divide each of one or more images acquired by a camera into a plurality of zones;
determine respective camera noise values for respective zones based on the one or more images;
determine one or more zone expected values for the one or more images by summing camera noise values multiplied by scalar coefficients for each zone and normalizing the sum by dividing by a number of zones in the plurality of zones; and
determine a source of the camera as being one of the same camera or an unknown camera based on comparing the one or more zone expected values to previously acquired expected zone values.

2. The computer of claim 1, the instructions including further instructions to, when the source of the camera is determined to be the same camera, output the one or more images.

3. The computer of claim 1, wherein the one or more images are output for biometric authorization, vehicle operation, robot operation or manufacturing operation.

4. The computer of claim 1, wherein verifying the source of the camera includes matching the one or more zone expected values to one or more previously acquired zone expected values determined based on previously acquired images from the camera.

5. The computer of claim 1, wherein matching includes determining that the zone expected values are equal to the previously acquired zone expected values within user-determined tolerances.

6. The computer of claim 1, wherein the camera noise values are determined by determining one or more photo response non-uniformity values $\hat{K}$, determined by the equation $\hat{K}=\Sigma_{i=1}^{m} W_i I_i / \Sigma_{i=1}^{m} (I_i)^2$ where $I_i$ is the i-th image acquired by the camera and $W_i$ is the noise residual of the i-th image.

7. The computer of claim 1, wherein the camera noise values are determined by determining camera dark current noise.

8. The computer of claim 1, wherein the zones are selected to correspond to a subset of zones that are determined to have more variation in fixed pattern image noise.

9. The computer of claim 1, wherein the scalar coefficients are determined empirically based on variances in the camera noise values.

10. The computer of claim 1, wherein a subset of the zones is selected to correspond to the zones determined to have high variation in fixed pattern image noise.

11. The computer of claim 1, wherein determining camera tampering includes determining peak correlation energy by performing template matching with previously determined camera noise values based on previously acquired images from the camera.

12. The computer of claim 1, wherein determining camera tampering includes processing the camera noise values with a neural network to determine a confidence score prediction, wherein the neural network is trained based on previously acquired images from the camera.

13. The computer of claim 1, wherein the camera noise values are determined based on full-scale resolution, quarter-scale resolution, and sixteenth-scale resolution.

14. The computer of claim 1, wherein the camera noise values are determined based on one or more of image fixed pattern noise mean, variance, skewness, and kurtosis.

15. The computer of claim 1, wherein the camera noise values are determined based on one or more of red, green, and blue channels of the one or more images.

16. A method, comprising:
dividing each of one or more images acquired by a camera into a plurality of zones;
determining respective camera noise values for respective zones based on the one or more images;
determining one or more zone expected values for the one or more images by summing the camera noise values multiplied by scalar coefficients for each zone and normalizing the sum by dividing by a number of zones in the plurality of zones; and
determining a source of the camera as being one of the same camera or an unknown camera based on comparing the one or more zone expected values to previously acquired expected zone values.

17. The method of claim 16, further comprising, when the source of the camera is determined to be the same camera, output the one or more images.

18. The method of claim 16, wherein the one or more images are output for biometric authorization, vehicle operation, robot operation or manufacturing operation.

19. The method of claim 16, wherein verifying the source of the camera includes matching the one or more zone expected values to one or more previously acquired zone expected values determined based on previously acquired images from the camera.

20. The method of claim 16, wherein matching includes determining that the zone expected values are equal to the previously acquired zone expected values within user-determined tolerances.

* * * * *